United States Patent
Guruswamy et al.

(10) Patent No.: US 8,209,756 B1
(45) Date of Patent: Jun. 26, 2012

(54) COMPOUND ATTACK DETECTION IN A COMPUTER NETWORK

(75) Inventors: Kowsik Guruswamy, Sunnyvale, CA (US); Siu-Wang Leung, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1995 days.

(21) Appl. No.: 11/045,572

(22) Filed: Jan. 27, 2005

Related U.S. Application Data

(63) Continuation-in-part of application No. 10/072,683, filed on Feb. 8, 2002.

(51) Int. Cl.
G06F 11/30 (2006.01)
G06F 17/30 (2006.01)

(52) U.S. Cl. ............... 726/23; 726/22; 726/24; 726/25; 713/188

(58) Field of Classification Search ............... 726/22–25; 713/188; 709/224–225
See application file for complete search history.

(56) References Cited

U.S. PATENT DOCUMENTS

| | | | |
|---|---|---|---|
| 5,787,253 A | 7/1998 | McCreery et al. | |
| 6,154,775 A | 11/2000 | Coss et al. | |
| 6,219,786 B1 | 4/2001 | Cunningham et al. | |
| 6,279,113 B1 | 8/2001 | Vaidya | |
| 6,301,668 B1 * | 10/2001 | Gleichauf et al. ............ | 726/25 |
| 6,321,338 B1 * | 11/2001 | Porras et al. ............ | 726/25 |
| 6,499,107 B1 * | 12/2002 | Gleichauf et al. ............ | 726/23 |
| 6,507,834 B1 | 1/2003 | Kabra et al. | |
| 6,751,728 B1 | 6/2004 | Gunter et al. | |
| 6,772,345 B1 | 8/2004 | Shetty | |
| 6,789,116 B1 | 9/2004 | Sarkissian et al. | |
| 6,845,452 B1 | 1/2005 | Roddy et al. | |
| 6,918,034 B1 | 7/2005 | Sengodan et al. | |
| 6,954,775 B1 * | 10/2005 | Shanklin et al. ............ | 718/105 |
| 7,007,301 B2 | 2/2006 | Crosbie et al. | |
| 7,016,980 B1 | 3/2006 | Mayer et al. | |
| 7,017,186 B2 * | 3/2006 | Day ............ | 726/23 |
| 7,065,657 B1 * | 6/2006 | Moran ............ | 726/5 |
| 7,076,803 B2 | 7/2006 | Bruton, III et al. | |
| 7,089,428 B2 | 8/2006 | Farley et al. | |
| 7,100,201 B2 * | 8/2006 | Izatt ............ | 726/11 |
| 7,174,566 B2 | 2/2007 | Yadav | |
| 7,222,366 B2 * | 5/2007 | Bruton et al. ............ | 726/23 |
| 7,234,168 B2 * | 6/2007 | Gupta et al. ............ | 726/25 |
| 7,240,368 B1 | 7/2007 | Roesch et al. | |
| 7,277,404 B2 | 10/2007 | Tanzella et al. | |
| 7,308,715 B2 * | 12/2007 | Gupta et al. ............ | 726/23 |
| 7,320,142 B1 * | 1/2008 | Kasper et al. ............ | 726/22 |
| 7,322,044 B2 | 1/2008 | Hrastar | |

(Continued)

OTHER PUBLICATIONS

"Intrusion Detection and Prevention", OneSecure, Inc., 2001, p. 1-6.*

(Continued)

*Primary Examiner* — Yin-Chen Shaw
(74) *Attorney, Agent, or Firm* — Shumaker & Sieffert, P.A.

(57) ABSTRACT

An intrusion detection and prevention (IDP) device includes an attack detection module and a forwarding component. The attack detection module applies a compound attack definition to a packet flow of a computer network to determine whether the packet flow includes at least one pattern and at least one protocol anomaly. The forwarding component selectively discards the packet flow based on the determination. The IDP device may further include a reassembly module to form application-layer communications from the packet flows, and a plurality of protocol-specific decoders to process the application-layer communications to extract application-layer elements and detect protocol anomalies.

29 Claims, 7 Drawing Sheets

U.S. PATENT DOCUMENTS

| | | | |
|---|---|---|---|
| 7,324,447 | B1 | 1/2008 | Morford |
| 7,324,804 | B2 | 1/2008 | Hrastar et al. |
| 7,331,061 | B1 | 2/2008 | Ramsey et al. |
| 7,383,577 | B2 | 6/2008 | Hrastar et al. |
| 7,424,744 | B1* | 9/2008 | Wu et al. ............ 726/23 |
| 7,441,267 | B1 | 10/2008 | Elliott |
| 7,526,541 | B2 | 4/2009 | Roese et al. |
| 7,769,851 | B1 | 8/2010 | Guruswamy et al. |
| 2002/0046275 | A1 | 4/2002 | Crosbie et al. |
| 2002/0053033 | A1 | 5/2002 | Cooper et al. |
| 2002/0055998 | A1 | 5/2002 | Riddle et al. |
| 2002/0078370 | A1 | 6/2002 | Tahan |
| 2002/0124187 | A1* | 9/2002 | Lyle et al. ............ 713/201 |
| 2002/0143939 | A1 | 10/2002 | Riddle et al. |
| 2002/0144156 | A1 | 10/2002 | Copeland, III |
| 2002/0166063 | A1* | 11/2002 | Lachman et al. ........ 713/200 |
| 2002/0198981 | A1 | 12/2002 | Corl, Jr. et al. |
| 2003/0065953 | A1* | 4/2003 | Lehmann et al. ........ 713/201 |
| 2003/0084319 | A1* | 5/2003 | Tarquini et al. ........ 713/200 |
| 2003/0105976 | A1 | 6/2003 | Copeland, III |
| 2003/0131263 | A1 | 7/2003 | Keane et al. |
| 2003/0149766 | A1 | 8/2003 | Syvanne et al. |
| 2003/0149887 | A1* | 8/2003 | Yadav ............ 713/200 |
| 2003/0154399 | A1* | 8/2003 | Zuk et al. ............ 713/201 |
| 2003/0182580 | A1 | 9/2003 | Lee |
| 2003/0204632 | A1 | 10/2003 | Willebeek-LeMair et al. |
| 2003/0212903 | A1 | 11/2003 | Porras et al. |
| 2003/0217289 | A1 | 11/2003 | Ammon et al. |
| 2003/0236990 | A1 | 12/2003 | Hrastar et al. |
| 2004/0015579 | A1 | 1/2004 | Cooper et al. |
| 2004/0015719 | A1 | 1/2004 | Lee et al. |
| 2004/0025044 | A1 | 2/2004 | Day |
| 2004/0034800 | A1 | 2/2004 | Singhal et al. |
| 2004/0044912 | A1 | 3/2004 | Connary et al. |
| 2004/0083299 | A1 | 4/2004 | Dietz et al. |
| 2004/0098623 | A1 | 5/2004 | Scheidell |
| 2004/0151382 | A1 | 8/2004 | Stellenberg et al. |
| 2004/0181690 | A1 | 9/2004 | Rothermel et al. |
| 2004/0255167 | A1* | 12/2004 | Knight ............ 713/201 |
| 2004/0268150 | A1 | 12/2004 | Aaron |
| 2005/0018618 | A1 | 1/2005 | Mualem et al. |
| 2005/0044406 | A1 | 2/2005 | Stute |
| 2006/0095968 | A1 | 5/2006 | Portolani et al. |
| 2006/0117386 | A1 | 6/2006 | Gupta et al. |
| 2006/0137009 | A1 | 6/2006 | Chesla |
| 2009/0064333 | A1 | 3/2009 | Saurabh et al. |

OTHER PUBLICATIONS

U.S Patent Application entitled "Application-Layer Monitoring and Profiling Network Traffic", U.S. Appl. No. 11/044,619, filed Jan. 27, 2005.

U.S. Patent Application entitled "Detection and Prevention of Encapsulated Network Attacks Using an Intermediate Device", U.S. Appl. No. 11/049,620, filed Feb. 2, 2005.

U.S. Patent Application entitled "Remote Aggregation of Network Traffic Profiling Data", U.S. Appl. No. 11/044,481, filed Jan. 27, 2005.

U.S. Patent Application entitled "Identification of Network Policy Violations", U.S. Appl. No. 11/044,332, filed Jan. 27, 2005.

U.S. Patent Application entitled "Automated Change Detection Within a Network Environment", U.S. Appl. No. 11/044,240, filed Jan. 27, 2005.

"Norton Internet Security™ 2003 User's Guide," 2002, Symantec Corporation.

"Ethereal 0.10.0 has been released", Dec. 12, 2003, www.ethereal.com, retrieved from the Internet Archive WayBackMachine, indexed Jan. 1, 2004.

Yannakakis, Perspectives on Database Theory, IEEE, Proceedings of $36^{th}$ Annual Symposium on Foundations of Computer Science, Milwaukee, Wisconsin, Oct. 23-25, 1995, 25 pgs.

Roelker, (Snort User Manual, HTTP inspect readme), Aug. 11, 2004, see §§ 2.1.7, 2.1.8, 2.1.10, 7 pgs.

Bitpipe, Reflex Interceptor Management Console Product Description, May 25, 2004, 1 pg.

Reflex Security, Reflex Interceptor Management Console Whitepaper, Jan. 29, 2004, 2 pgs.

Wikipedia, Cisco PIX, Apr. 9, 2009, 11 pgs.

"Intrusion Detection and Prevention," OneSecure, Inc., 2001 pp. 1-6.

Notice of Allowance in U.S. Appl. No. 11/044,619, mailed Dec. 15, 2009, 8 pp.

Office Action from U.S. Appl. No. 11/044,240, dated Jan. 27, 2010, 17 pp.

Response to Office Action from U.S. Appl. No. 11/044,240, filed Apr. 27, 2010, 12 pp.

Office Action for U.S. Appl. No. 11/044,481, dated Nov. 9, 2009, 15 pp.

Response to Office Action dated Nov. 9, 2009, for U.S. Appl. No. 11/044,481, filed Feb. 9, 2010, 13 pp.

Reflex Security, Reflex Interceptor 500, Jan. 29, 2004 http://web.archive.org/web/20040605205639/http://reflexsecurity.com/documents/ReflexInterceptor-500V32004-01-29.pdf, 2 pp.

Reflex Security, Reflex Intrusion Prevention System, May 7, 2004, 11 pp.

Brugger, "Data Mining Methods for Network Intrusion Detection," Jun. 9, 2004, 65 pp.

Campos, et al., "Creation and Deployment of Data Mining-Based Intrusion Detection Systems in Oracle Database 10g", In Proceedings of the Fourth International Conference on Machine Learning and Applications, Sep. 2005, 8 pp.

Warshaw et al., "Monitoring Network Logs for Anomalous Activity", Applied Research Laboratories, Department of Computer Sciences, University of Texas at Austin, Oct. 9, 1998, 6 pp.

Warshaw et al., "VenusIDS: An Active Database Component for Intrusion Detection", Applied Research Laboratories, Department of Computer Sciences, University of Texas at Austin, Jun. 11, 1999, 12 pp.

Jain et al., "A Wakeup Call for Internet Monitoring Systems: The Case for Distributed Triggers", 2004, 6 pp.

Notice of Allowance in U.S. Appl. No. 11/049,620, mailed Dec. 9, 2009, 21 pp.

Office Action from U.S. Appl. No. 11/044,332, dated Apr. 29, 2010, 18 pp.

Response to Office Action from U.S. Appl. No. 11/044,332, dated Jul. 29, 2010, 6 pp.

Notice of Allowance in U.S. Appl. No. 11/044,481, mailed May 28, 2010, 18 pp.

Notice of Allowance in U.S. Appl. No. 11/044,240, mailed Jun. 1, 2010, 12 pp.

* cited by examiner

COMPOUND ATTACK DETECTION IN A COMPUTER NETWORK

RELATED APPLICATIONS

This application is a continuation-in-part of U.S. patent application Ser. No. 10/072,683 filed Feb. 8, 2002.

TECHNICAL FIELD

The invention relates to computer networks and, more particularly, to detection and prevention of attacks in computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities.

Conventional techniques for detecting network attacks use pattern matching. In particular, regular expressions or sub-string matches are used to detect defined patterns within a protocol stream. Multiple patterns may be used in an attempt to improve the accuracy of the attack detection. In some situations, however, it is difficult to detect certain network attacks using solely pattern matching.

SUMMARY

In general, the invention is directed to techniques for detecting and preventing network attacks. More specifically, an intrusion detection and prevention (IDP) device monitors network traffic and analyzes the traffic to detect network attacks. The IDP device integrates textual and non-textual pattern matching with protocol-specific anomaly detection to identify sophisticated attack behaviors. In particular, the IDP device allows the system administrator to specify compound attack definitions. The compound attack definitions may specify any combination of patterns and protocol anomalies to define complex attack signatures.

In one embodiment, a method comprises applying a compound attack definition to a packet flow of a computer network to determine whether the packet flow includes a pattern and at least one protocol anomaly. The method further comprises selectively discarding the packet flow based on the determination.

In another embodiment, a network device comprises an attack detection module and a forwarding component. The attack detection module applies a compound attack definition to a packet flow of a computer network to determine whether the packet flow includes at least one pattern and at least one protocol anomaly. The forwarding component selectively discards the packet flow based on the determination.

In another embodiment, a computer-readable medium comprises instructions to cause a processor to present a user interface that receives input specifying a compound attack definition that defines at least one pattern and at least one protocol anomaly. The instructions further cause the processor to configure a forwarding plane of a network device to apply the compound attack definition to a packet flow of a computer network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
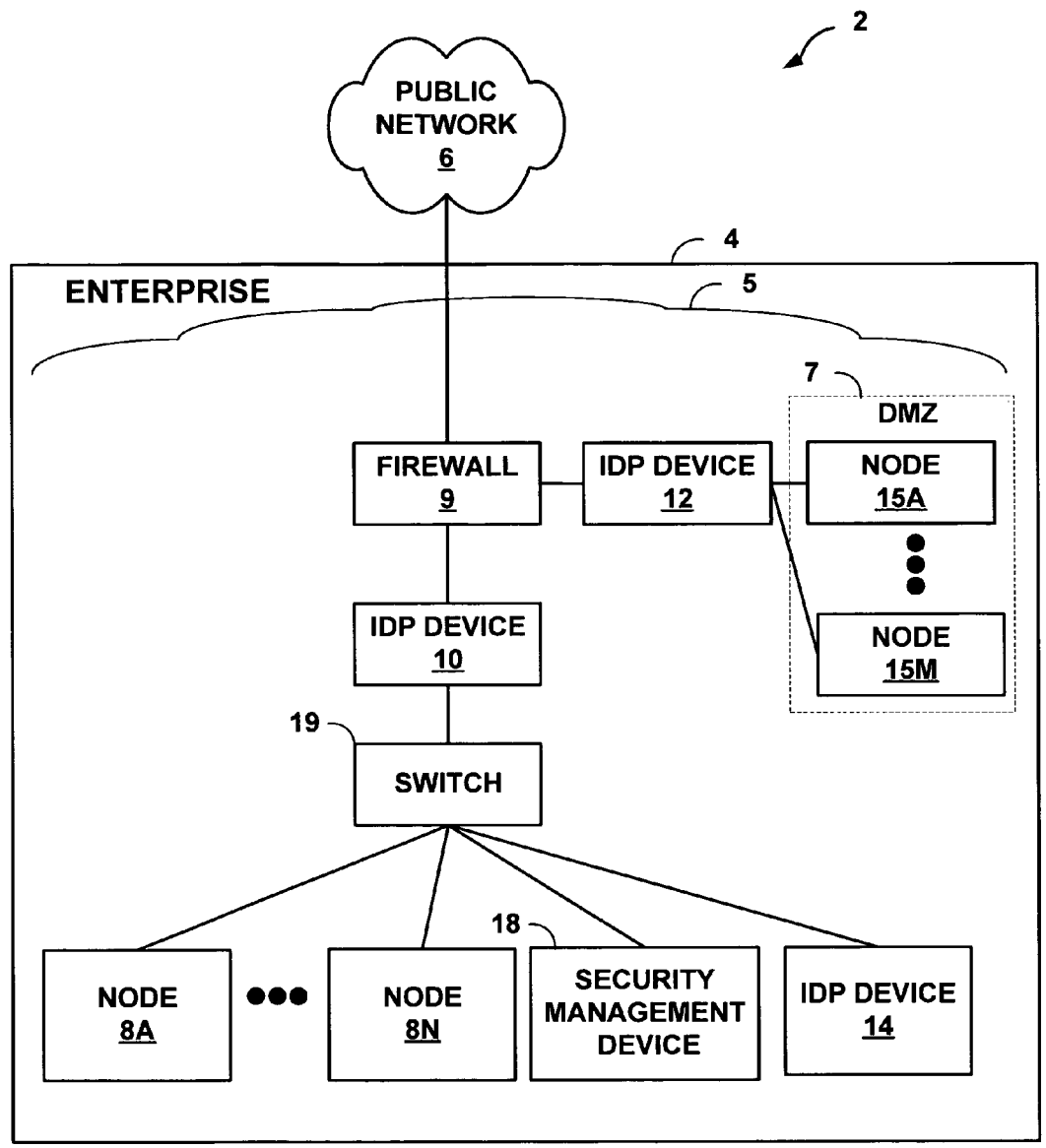
FIG. 1 is a block diagram illustrating an exemplary enterprise computer network in which an intrusion detection and prevention (IDP) device integrates pattern matching with protocol-specific anomaly detection in accordance with the principles of the invention.

FIG. 1 is a block diagram illustrating an exemplary system 2 in which enterprise 4 includes a private enterprise computing network 5 that is coupled to public network 6, such as the Internet. Firewall 9 protects enterprise network 5 and, in particular, internal computing nodes 8A-8N. Computing nodes 8A-8N (computing nodes 8) represent any private computing device within enterprise network 5, including workstations, file servers, print servers, database servers, printers and other devices.

In addition, firewall 9 may provide a "demilitarized zone" (DMZ) 7, which represents a semi-private area of enterprise network 5 that supports limited access by public network 6 via specific communication protocols. For example, client devices (not shown) within public network 6 may have limited access to nodes 15A-15M via the hypertext transport protocol (HTTP) or the file transfer protocol (FTP).

In the example of FIG. 1, enterprise network 5 includes intrusion detection and prevention (IDP) device 10 that monitors traffic flowing between firewall 9 and internal computing nodes 8. IDP device 10 analyzes the network traffic to detect network attacks.

In accordance with the principles of the invention, IDP device 10 integrates pattern matching with protocol-specific anomaly detection to identify sophisticated attack behaviors. In particular, IDP device 10 allows the system administrator to specify compound attack definitions. The compound attack definitions may specify, for example, any combination of textual and non-textual (e.g., binary) patterns and protocol anomalies to define complex attack signatures.

In general, IDP device 10 identifies packet flows in the monitored traffic, and transparently reassembles application-layer communications from the packet flows. A set of protocol-specific decoders within the IDP device 10 analyzes the application-layer communications and identifies application-layer transactions. In general, a "transaction" refers to a bounded series of related application-layer communications between peer devices. For example, a single TCP connection can be used to send (receive) multiple HyperText Transfer Protocol (HTTP) requests (responses). As one example, a single web-page comprising multiple images and links to html pages may be fetched using a single TCP connection. An HTTP decoder identifies each request/response within the TCP connection as a different transaction. This may be useful to prevent certain compound attack definitions from being applied across transaction boundaries.

For each transaction, the corresponding decoder analyzes the application-layer communications and extracts protocol-specific elements. For example, for an FTP login transaction, the FTP decoder may extract a pattern corresponding to a user name, a name for the target device, a name for the client device and other information.

In addition, the decoders analyze the application-layer communications associated with each transaction to determine whether the communications contain any protocol-specific "anomalies." In general, a protocol anomaly refers to any detected irregularity within an application-layer communication that does not comply with generally accepted rules of communication for a particular protocol. The rules may, for example, be defined by published standards as well as vendor-defined specifications. Other anomalies refer to protocol events (i.e., actions) that technically comply with protocol rules but that may warrant a heightened level of scrutiny. One example of such a protocol event is repeated failure of an FTP login request. Example anomalies for the HTTP protocol include missing HTTP version information, malformed universal resource locators (URLs), directory traversals, header overflow, authentication overflow and cookie overflow. Example anomalies for SMPT protocol include too many recipients, relay attempts, and domain names that exceed a defined length. Examples anomalies for the POP3 protocol include user overflow and failed logins. Example anomalies for the FTP protocol include missing arguments, usernames or pathnames that exceed a defined length and failed logins. Other anomalies include abnormal and out-of-specification data transmissions, and commands directing devices to open network connections to devices other than the client devices issuing the commands.

Typical protocol anomalies often cannot easily be detected with conventional pattern matching as the detection is not based on specific text strings. Rather, protocol anomaly detection may be based on relationships between two or more elements of a network protocol and, in particular, determination of whether the relationships conform to the generally accepted rules for that particular protocol. In some situations, protocol anomaly detection may be used to detect unknown and new attacks based on the fact that these attack deviate from generally accepted communication standards.

IDP device 10 applies the compound attack definitions to the elements and the protocol-specific anomalies identified by the protocol decoders to detect and prevent network attacks. For example, a system administrator may specify a compound network attack that includes the protocol anomaly of repeated FTP login failure and a pattern that matches a login username of "root." In this manner, the system administrator may combine pattern analysis with protocol anomalies to define complex attack definitions. In the event of a network attack, IDP device 10 may take one or more programmed actions, such as automatically dropping packet flows associated with the application-layer communications within which the network attack was detected.

In some embodiments, enterprise network 5 may include multiple IDP devices 10, 12 and 14 located within different regions (e.g., sub-networks) of enterprise network 5. Security management device 18 may operate as a central device for managing IDP devices 10, 12 and 14. Although the example illustrated in FIG. 1 is described in terms of dedicated IDP devices 10, 12 and 14, the functionality described herein may be incorporated within other devices, such as firewall 9 or switch 19.

Figure 2:
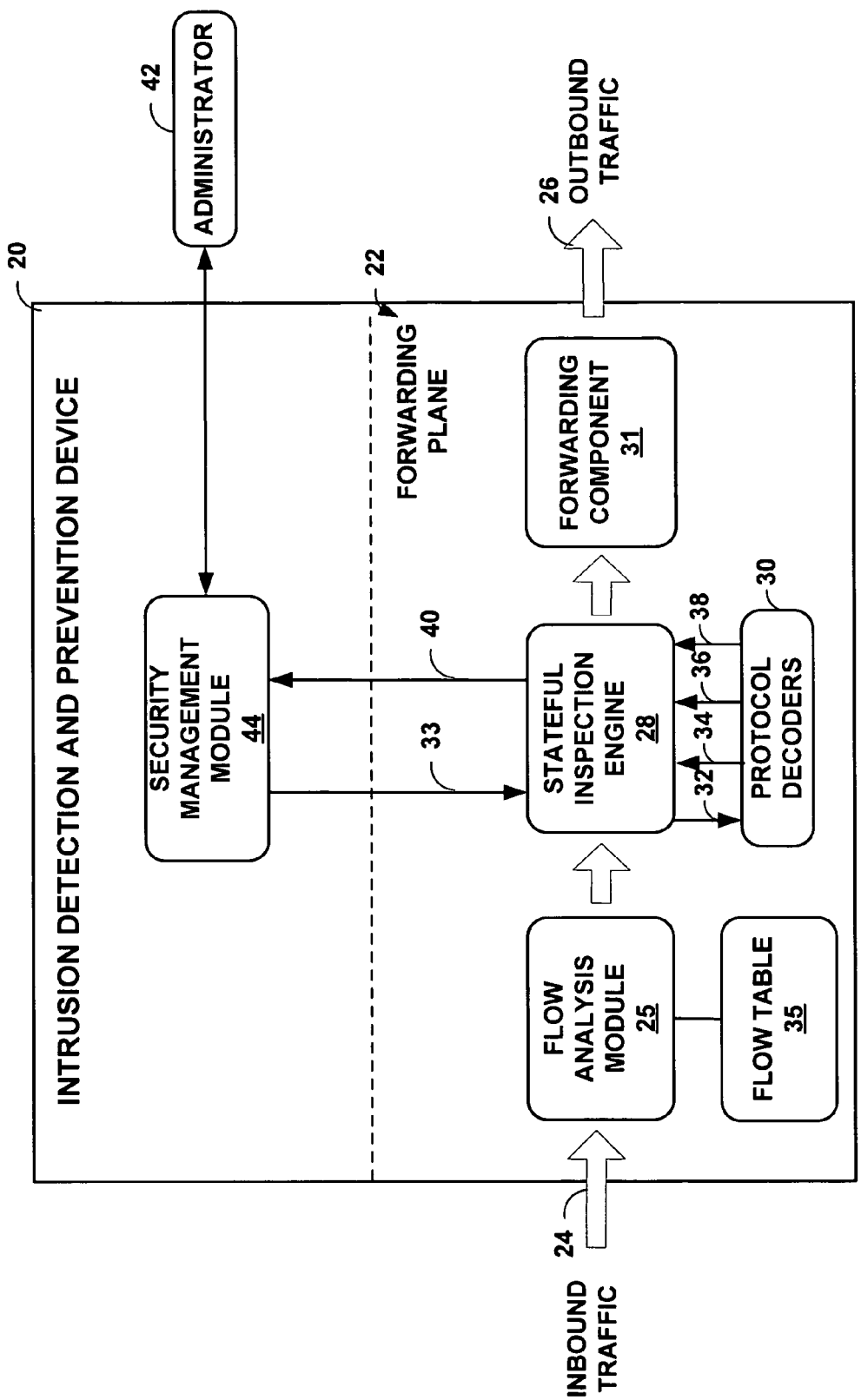
FIG. 2 is a block diagram illustrating an exemplary embodiment of the IDP device in further detail.

FIG. 2 is a block diagram illustrating an example embodiment of an IDP device 20. IDP device 20 includes a forwarding plane 22 that transparently monitors inbound network traffic 24 and forwards the network traffic as outbound network traffic 26. In the example illustrated by FIG. 2, forwarding plane 22 includes flow analysis module 25, stateful inspection engine 28, protocol decoders 30, forwarding component 31 and security management module 44.

Security management module 44 presents a user interface by which administrator 42 configures IDP device 20. For example, administrator 42 may configure IDP device 20 to monitor particular subnets of the enterprise network. In addition, security management module 44 presents a user interface by which administrator 42 may specify compound attack definitions 33, which security management module 44 relays to stateful inspection engine 28.

Flow analysis module 25 receives inbound traffic 24 and identifies network flows within the traffic. Each network flow represents a communication session within the network traffic and is identified by at least a source address, a destination address and a communication protocol. Flow analysis module 25 may utilize additional information to specify network flows, including source media access control (MAC) address, destination MAC address, source port and destination port.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow.

For each packet flow, stateful inspection engine 28 buffers a copy of the packets and reassembles the copied packets to form application-layer communications 32. For example, stateful inspection engine 28 may reconstruct TCP segments into application-layer communications 32, which represent protocol-specific messages.

Stateful inspection engine 28 invokes the appropriate one of protocol decoders 30 to analyze the application-layer communications 32. Protocol decoders 30 represent a set of one or more protocol-specific software modules. Each of protocol decoders 30 corresponds to a different communication protocol or service. Examples of communication protocols that may be supported by protocol decoders 30 include the Hyper-Text Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols.

Protocol decoders 30 analyze reassembled application-layer communications 32 and output transaction data 34 that identifies application-layer transactions. In particular, transaction data 34 indicate when a series of related application-layer communications between two peer devices starts and ends.

In addition, protocol decoders 30 analyze application-layer communications 32 and extract protocol-specific elements in the form of text. As used herein, the term "application-layer elements" refer to protocol-specific text strings obtained at the application-layer. In particular, protocol decoders 30 extract protocol-specific "contexts" and "values" from the reassembled application-layer communications. In general, "contexts" are named elements within a protocol stream that uniquely identifies various types of application-level elements. The named elements provide an application-level basis for describing a communication session. Examples of contexts include file names, user names, application names, names of attached documents, protocol-specific header information, protocol-specific authorization data, form data and other information that describes the communication session. As a particular example, a context for an HTTP protocol stream may include the name of a server providing the HTTP service and the name of the type of web browser (e.g., "Internet Explorer") accessing the server. By reassembling application-layer communications, protocol decoders 30 extract specific contexts (e.g., browser type) and corresponding values (e.g., "Internet Explorer"). Protocol decoders 30 output application elements 36 to stateful inspection engine 28 for subsequent analysis.

In addition, protocol decoders 30 apply protocol-specific algorithms to application-layer communications 32 to identify protocol anomalies within each transaction. Protocol decoders 30 output protocol anomaly data 38 to stateful inspection engine 28 for further analysis and use in attack detection.

Stateful inspection engine 28 receives transaction data 34, application-layer elements 36 and protocol anomaly data 38 from protocol decoders 30. Stateful inspection engine 28 applies compound attack definitions 33 to protocol-specific application-layer elements 36 and anomaly data 38 to detect and prevent network attacks and other security risks.

In the event a security risk is detected, stateful inspection engine 28 outputs alert 40 to security management module 44 for logging and further analysis. In addition, stateful inspection engine 28 may take additional action, such as dropping the packets associated with the communication session, automatically closing the communication session or other action. If no security risk is detected for a given application-layer communication session, forwarding component 31 continues to forward the packet flows between the peers. Forwarding component 31 may, for example, maintain a routing table that stores routes in accordance with a topology of the enterprise network for use in forwarding the packet flows.

Figure 3:
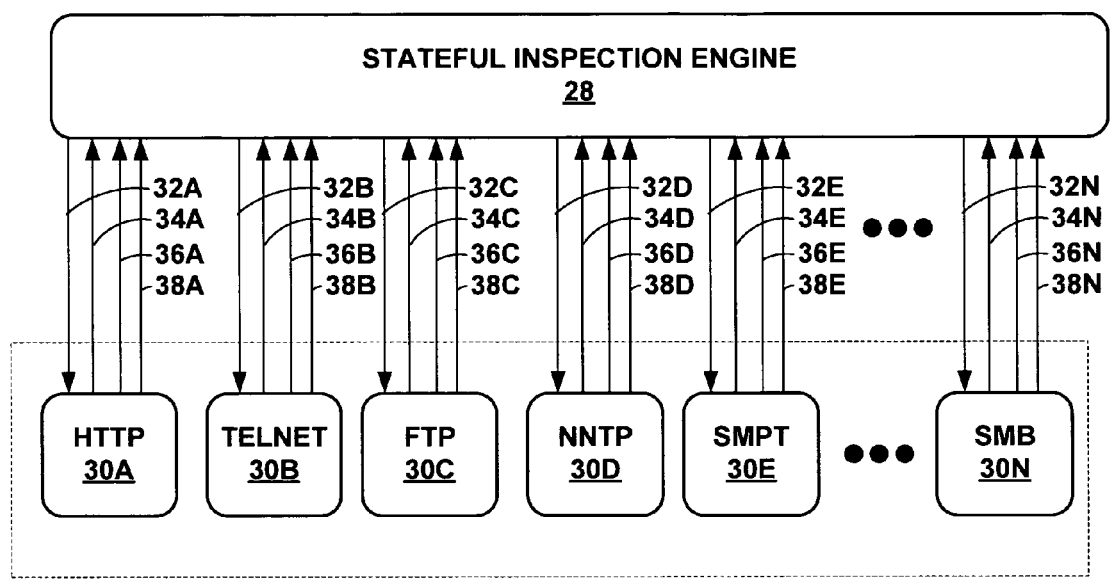
FIG. 3 is a block diagram that illustrates an exemplary set of protocol decoders of the IDP device.

FIG. 3 illustrates a portion of IDP device 20 (FIG. 2) in further detail. In particular, FIG. 3 illustrates an exemplary set of protocol decoders 30A-30N. In this example, protocol decoders 30A-30N include HTTP decoder 30A, Telnet decoder 30B, FTP decoder 30C, NNTP decoder 30D, SMTP decoder 30E and SMB decoder 30N.

As illustrated in FIG. 3, each of protocol decoders 30A-30N analyzes corresponding protocol-specific application-layer communications 32A-32N that have been reassembled by stateful inspection engine 28. Based on the analysis, each of protocol decoders 30A-30N output corresponding transaction data 34A-34N identifying transactions within the communications, application-layer elements 36A-36N describing contexts and values associated with the communications, and protocol anomaly data 38A-38N that describe any protocol anomalies detected within the communications.

Figure 4:
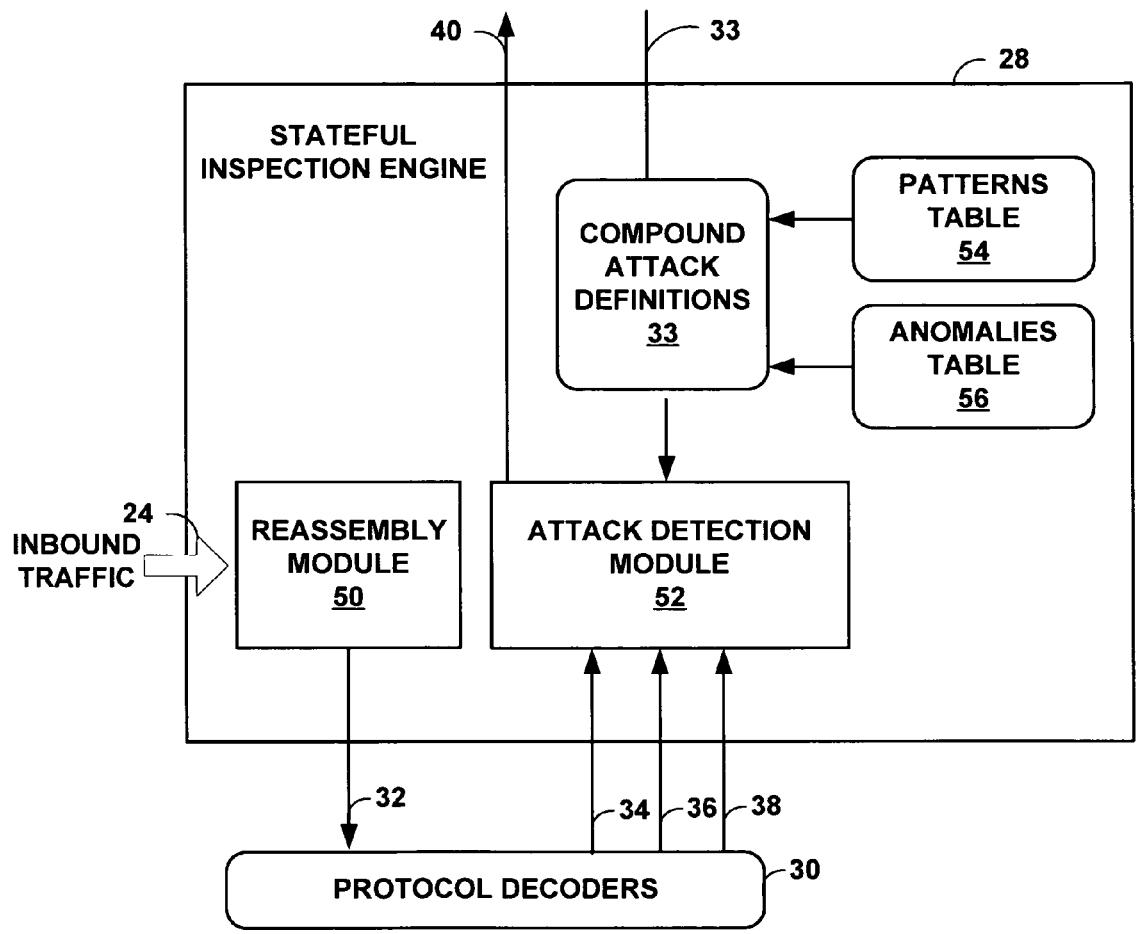
FIG. 4 is a block diagram that illustrates an example embodiment of a stateful inspection engine of the IDP device.

FIG. 4 is a block diagram that illustrates an example embodiment of stateful inspection engine 28. In the example embodiment, stateful inspection engine 28 includes reassembly module 50 and attack detection module 52. In addition, stateful inspection engine 28 includes patterns table 54, anomalies table 56 and compound attack definitions 33.

Reassembly module 50 receives inbound network traffic 24 and reassembles application-layer communications 32 from the packet flows. Reassembly module 50 forwards the reassembled application-layer communications 32 to the appropriate protocol decoders 30 for processing.

Stateful inspection engine 28 stores compound attack definitions 33 received from security management module 44 (FIG. 2). Each of compound attack definitions 33 specifies a combination of one or more patterns specified within patterns table 54 and one or more protocol-specific anomalies specified within anomalies table 56.

Attack detection module 52 applies compound attack definitions 33 to application-layer elements 36 and protocol anomaly data 38 received from protocol decoders 30. In particular, for each of compound attack definitions 33, attack detection module 52 selects the one or more patterns within patterns table 52 specified by the compound attack definition and determines whether any of application-layer elements 36 match the defined patterns. Each of the patterns may be defined as a respective "regular expression," which generally refers to a formula that is used to match patterns within data.

In addition to determining whether the defined patterns are present, attack detection module 52 may determine whether any protocol anomalies detected by protocol decoders 30 match the protocol anomalies specified by compound attack definitions 33. Attack detection module 52 determines that the corresponding packet flow matches one of compound attack definitions 33 when both the patterns and protocol anomalies specified by the compound attack definition are detected within a given communication session. Further, each of compound attack definitions 33 may specify whether the pattern matching and protocol anomalies must be satisfied on a per-transaction basis or over the lifetime of the communication session.

In the event a security risk is detected, stateful inspection engine 28 outputs alert 40 to security management module 44 (FIG. 2) for logging and further analysis. Stateful inspection engine 28 may also direct forwarding component 31 to automatically drop the packet flow associated with the application-layer communications within which the network attack was detected. In this manner, stateful inspection engine 28 combines pattern matching with protocol-specific anomaly analysis to detect sophisticated attack behaviors.

Figure 5:
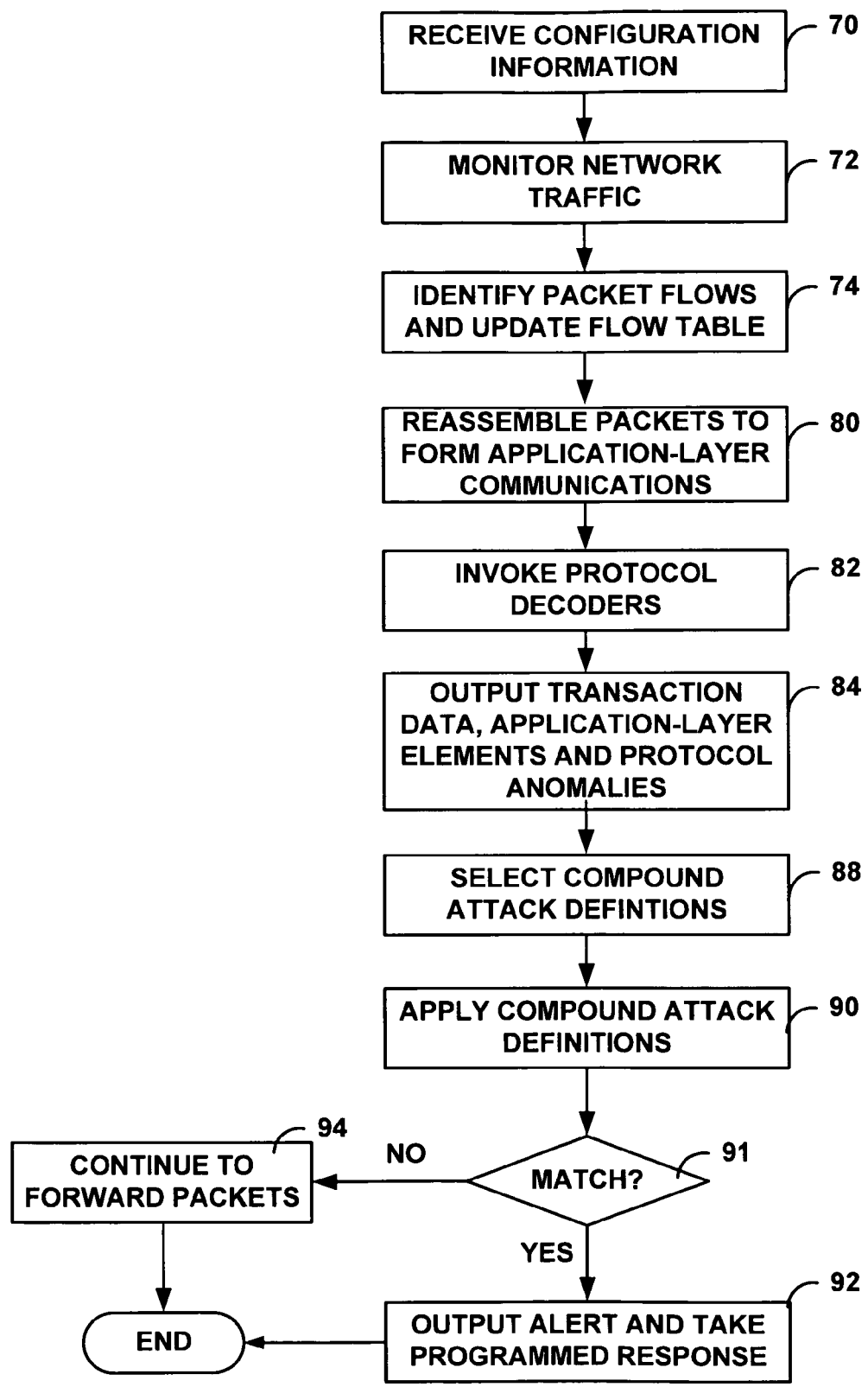
FIG. 5 is a flowchart illustrating exemplary operation of an IDP device in accordance with the principles of the invention.

FIG. 5 is a flowchart illustrating exemplary operation of an IDP device in accordance with the principles of the invention. For exemplary purposes, the flowchart is described in reference to IDP device 20 (FIG. 2).

Initially, security management module 44 receives configuration information from administrator 42 and, in response, configures IDP device 20 to monitor subnets of interest (70). During this process, configuration manager 44 may present a user interface by which administrator 42 specifies compound attack definitions 33.

Once configured, IDP device 20 monitors network traffic 24 (72). In some configurations, stateful inspection engine 28 of forwarding plane 22 may receive network traffic and mirror the network traffic for purposes of analysis. Forwarding component 31 seamlessly forwards the original network traffic.

Flow analysis module 25 analyzes the network traffic to identify packet flows and updates flow table 35 to describe each active flow present within the network traffic (74). Next, stateful inspection engine 28 buffers and reassembles the packets to form application-layer communications 32 (80), and invokes the appropriate protocol decoders 30 to analyze the application-layer communications (82).

Protocol decoders 30 analyze reassembled application-layer communications 32 and communicate transaction data 34, application-layer elements 36 and protocol anomaly data 38 to stateful inspection engine 28 (84).

Upon receiving data from protocol decoders 30, stateful inspection engine 28 selects the compound attack definitions 33 that are defined for the corresponding protocol (88). Stateful inspection engine 28 then applies the selected compound attack definition to determine whether the communication session represents a security risk (90). When applying a given compound attack definition, stateful inspection engine 28 determines whether all of the specified patterns and protocol anomalies are satisfied for any given communication session between peers, either on a per-transaction basis or over the lifetime of the communication session, as specified by the compound attack definition. Moreover, if required by the compound attack definition, stateful inspection engine 28 may determine whether the specified patterns and protocol anomalies are satisfied in a required order.

In the event a security risk (i.e., match) is detected (91), stateful inspection engine 28 outputs alert 40 to security management module 44 for logging and further analysis (92). In addition, stateful inspection engine 28 may take any of a number of programmed responses, such as dropping the packets associated with the communication session, automatically closing the communication session or other action. If no security risk is detected for a given application-layer communication session, forwarding component 31 continues to forward the packet flows between the peers (94).

Figure 6:
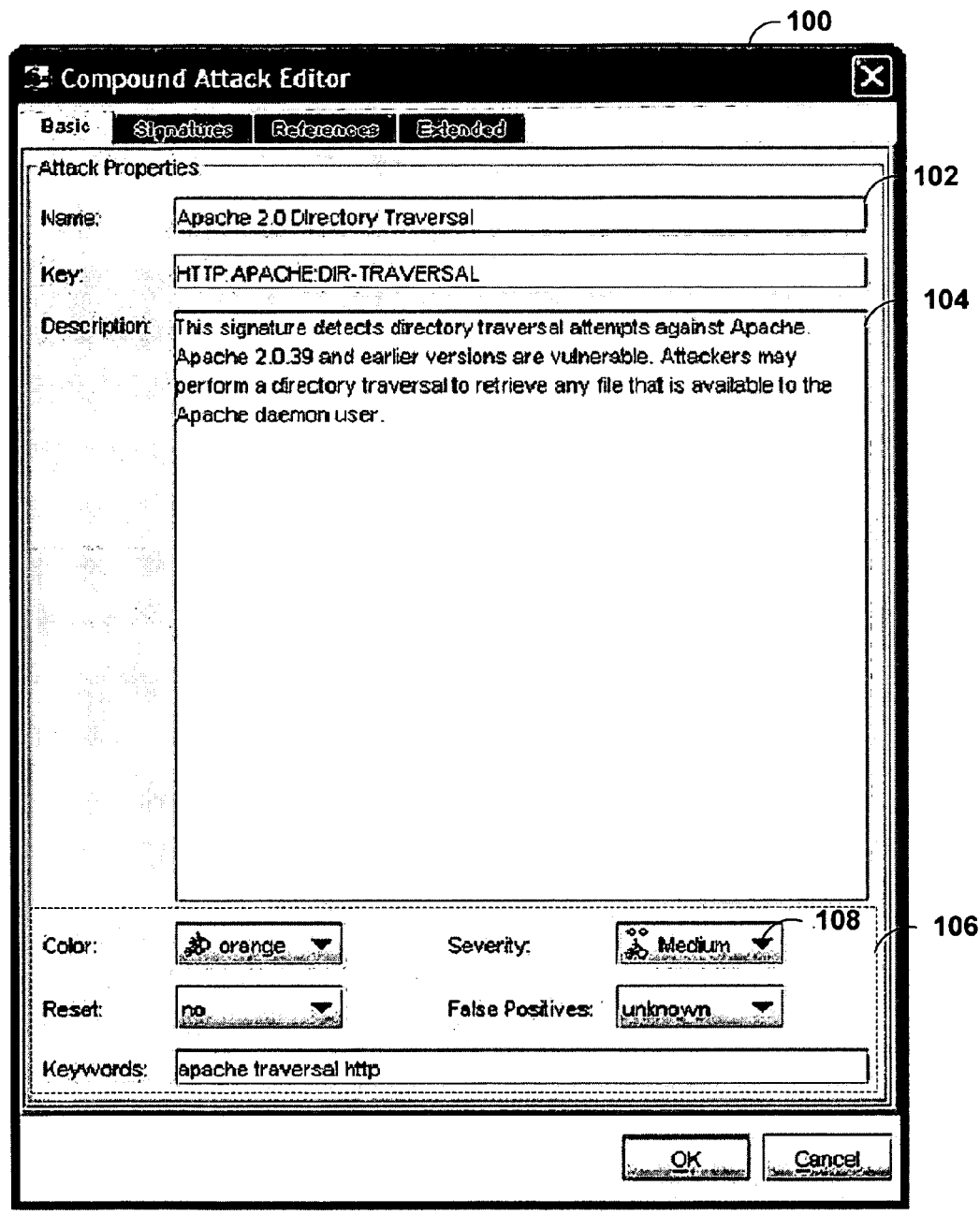
FIGS. 6 and 7 are example user interfaces presented by the IDP device.

FIG. 6 is an example user interface 100 presented by an IDP device with which an administrator interacts to create a compound network attack definition. As illustrated in FIG. 6, user interface 100 includes an input 102 by which the administrator may provide a name for the compound network attack. In addition, interface 100 includes an input 104 by which the administrator may provide a brief description for the compound network attack. The example of FIG. 6 illustrates a compound network attack for detecting directory traversal attempts against an Apache web server.

In addition, interface 100 includes inputs 106 by which the administrator may provide other data for the compound network attack, such as a severity level 108, keywords for use in indexing and analysis, and other data.

Figure 7:
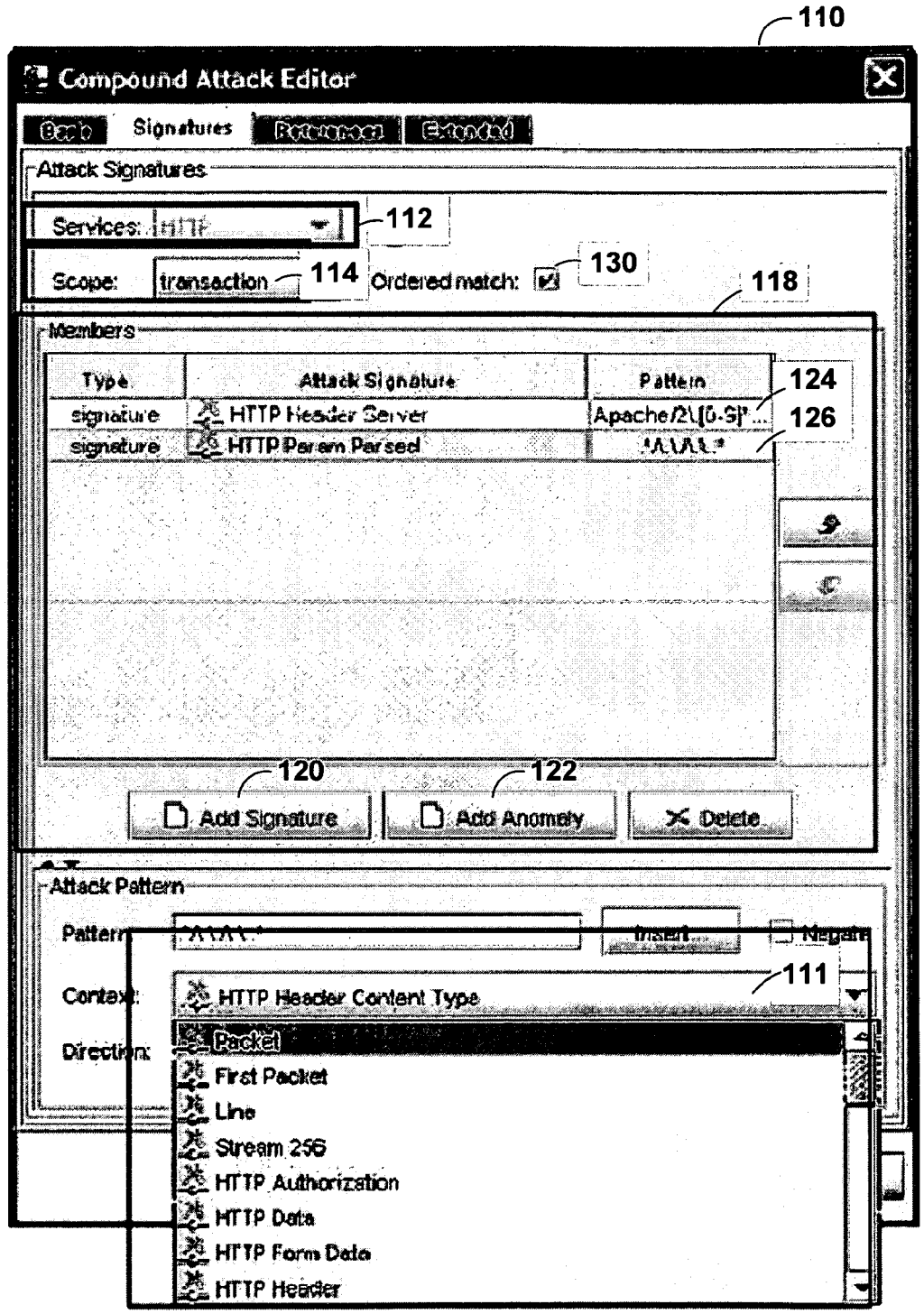

FIG. 7 is an example of user interface 110 presented when the user selects the "Signatures" tab of user interface 100 (FIG. 6). As illustrated, user interface 110 includes an input 112 with which the administrator specifies a protocol to which the compound attack definition pertains. In this example, the administrator has selected HTTP as this exemplary compound network attack definition relates to an Apache web server.

User interface 110 further includes an input 111 by which the administrator selects from a list of contexts for the particular protocol selected in input 112. For example, input 111 provides a drop-down menu by which the administrator selects HTTP contexts, such as HTTP Authorization, HTTP data, HTTP form data and other contexts available from the headers in an HTTP communication.

User interface 110 further includes an input 114 by which the administrator selects a scope for the compound attack definition is to be applied. In particular, input 114 allows the administrator to specify whether the attack is session based (i.e., to be applied over the life-time of a session and across all transactions associated with the session) or transaction based (i.e., applied on a per transaction basis and cleared at the end of each transaction).

User interface 110 further includes an input area 118 by which the administrator defines the constituent members of the compound attack definition. In particular, the administrator may add patterns by selecting Add button 120 or protocol anomalies by selecting Add button 122. Input area 118 lists the members currently defined for the compound attack definition. In this example, two patterns 124, 126 have been defined in the form of regular expressions.

User interface 110 also includes an input 130 by which the administrator controls whether the constituent members must be detected in the order presented within input area 118 or whether the members may be detected in any order within the scope defined by input area 114.

Various embodiments of the invention have been described. Although the embodiments have been described in terms of packet-based systems and methods, any network and application-layer profiling data may be correlated for other types of networks without departing from the principles of the invention. These and other embodiments are within the scope of the following claims.

The invention claimed is:

1. A method comprising:

presenting, with a network device, a user interface to define a compound attack definition for detecting a network attack identified by ordered occurrences in a packet flow of both at least one pattern and at least one protocol anomaly, wherein the at least one pattern identifies a binary pattern associated with a network attack that is different from the at least one protocol anomaly, and wherein the user interface includes a first input to select the at least one pattern, a second input to select the at least one protocol anomaly, and a third input that specifies an order in which the at least one pattern and the at least one protocol anomaly must occur in the packet flow for the compound attack definition to determine that the packet flow constitutes the network attack;

receiving, with the network device, input data selecting the at least one protocol anomaly, the at least one pattern and the order via the respective first, second and third inputs of the user interface to define the compound attack definition for detecting the network attack;

applying, with the network device, the compound attack definition to a packet flow of a computer network to determine whether the packet flow constitutes the network attack in that the packet flow includes both of the at least one pattern and the at least one protocol anomaly in the order specified by the compound attack definition; and selectively discarding, with the network device, the packet flow based on the determination of whether the packet flow constitutes the network attack.

2. The method of claim 1, wherein applying a compound attack definition comprises:

processing the packet flow with a network device to form application-layer communications from the packet flow; and processing the application-layer communications to determine whether the packet flow includes the pattern and the protocol anomaly.

3. The method of claim 2, wherein processing the application-layer communications comprises:

processing the application-layer communications with protocol-specific decoders to identify application-layer elements; and analyzing the application-layer elements to determine whether the pattern is present within the application-layer elements.

4. The method of claim 2, wherein processing the application-layer communications comprises:

processing the application-layer communications with protocol-specific decoders to identify application-layer elements; and analyzing relationships between the application-layer elements with the protocol-specific decoders to detect the protocol anomaly.

5. The method of claim 2, wherein processing the application-layer communications comprises processing the application-layer communications with at least one of a HyperText Transfer Protocol (HTTP) decoder, a File Transfer Protocol (FTP) decoder, a Network News Transfer Protocol (NNTP) decoder, a Telnet decoder, a Domain Name System (DNS) decoder, a Gopher decoder, a Finger decoder, a Post Office Protocol (POP) decoder, a Secure Socket Layer (SSL) protocol decoder, a Lightweight Directory Access Protocol (LDAP) decoder, a Secure Shell (SSH) decoder, a Server Message Block (SMB) decoder or a Simple Mail Transfer Protocol (SMTP) decoder.

6. The method of claim 2, wherein processing the application-layer communications comprises identifying contexts within the application-layer communications and values for named elements within the contexts.

7. The method of claim 6, wherein the named elements for the application-layer communications include at least one of a file name, a user name, a software application name, protocol-specific header information, protocol-specific authorization data, form data or a name of an attached document.

8. The method of claim 1, wherein the protocol anomaly is an irregularity within the application-layer elements that does not comply with at least one standard for a communication protocol.

9. The method of claim 1, wherein the protocol anomaly is a protocol event.

10. The method of claim 1, wherein applying a compound attack definition comprises:
detecting transactions within the application-layer communications; and
applying the compound attack definition to the packet flow on a per-transaction basis.

11. The method of claim 1, wherein applying a compound attack definition comprises applying the compound attack definition on a per-session basis.

12. The method of claim 1, wherein selectively discarding comprises:
discarding network packets associated with packet flow when the packet flow includes both the pattern and the protocol anomaly; and
forwarding the network packets when the packet flow does not include either the pattern or the protocol anomaly.

13. A network device comprising:
a processor;
a user interface to define a compound attack definition for detecting a network attack identified by ordered occurrences in a packet flow of both at least one pattern and at least one protocol anomaly in a packet flow, wherein the at least one pattern identifies a binary pattern associated with a network attack that is different from the at least one protocol anomaly, and wherein the user interface includes a first input to select the at least one pattern, a second input to select the at least one protocol anomaly, and a third input that selects an order in which the at least one pattern and the at least one protocol anomaly must occur in the packet flow for the compound attack definition to determine to the packet flow constitutes the network attack,
wherein the user interface receives input data selecting the at least one protocol anomaly, the at least one pattern and the order via the respective first, second and third inputs of the user interface to define the compound attack definition for detecting the network attack;
an attack detection module to apply the compound attack definition to a packet flow of a computer network to determine whether the packet flow constitutes the network attack in that the packet flow includes both of the at least one pattern and the at least one protocol anomaly in the order specified by the compound attack definition; and
a forwarding component to selectively discard the packet flow based on the determination of whether the packet flow constitutes the network attack.

14. The network device of claim 13, further comprising:
a reassembly module to form application-layer communications from the packet flows; and
a plurality of protocol-specific decoders to process the application-layer communications to extract application-layer elements and detect protocol anomalies.

15. The network device of claim 14, wherein the attack detection module applies the compound attack definition by determining whether the extracted application-layer elements conform to the pattern and whether the detect protocol anomalies include the protocol anomaly of the compound attack definition.

16. The network device of claim 14, wherein the plurality of protocol-specific decoders include at least one of a HyperText Transfer Protocol (HTTP) decoder, a File Transfer Protocol (FTP) decoder, a Network News Transfer Protocol (NNTP) decoder or a Simple Mail Transfer Protocol (SMTP) decoder.

17. The network device of claim 14, wherein the application-layer elements comprise textual values for named elements within the application-layer communications.

18. The network device of claim 17, wherein the named elements for the application-layer communications include at least one of a file name, a user name, a software application name, protocol-specific header information, protocol-specific authorization data, form data or a name of an attached document.

19. The network device of claim 14,
wherein the plurality of protocol decoders detect transactions within the application-layer communications and output transaction data; and
wherein the attack detection module receives the transaction data and applies the compound attack definition on a per-transaction basis.

20. The network device of claim 13, further comprising:
a patterns table storing a plurality of regular expressions defining patterns; and
an anomalies table defining a plurality of protocol-specific anomalies that fail to comply with at least one communication standard.

21. The network device of claim 13, wherein the attack detection module applies the compound attack definition on a per-session basis.

22. The network device of claim 13, wherein the forwarding component discards network packets associated with packet flow when the packet flow includes both the pattern and the protocol anomaly.

23. The network device of claim 22, wherein the forwarding component includes a routing table storing routes for the computer network.

24. The network device of claim 13, wherein the network device comprises a router or a firewall.

25. A non-transitory computer-readable medium comprising instructions that cause a programmable processor within a network device to:
present a user interface that receives input specifying a compound attack definition for detecting a network attack identified by ordered occurrences in a packet flow of both at least one pattern and at least one protocol anomaly, wherein the at least one pattern identifies a binary pattern associated with a network attack that is different from the at least one protocol anomaly, and wherein the user interface includes a first input by which to receive the input defining the at least one pattern, a second input by which to receive the input defining the at least one protocol anomaly, and a third input by which to receive the input defining an order in which the at least one pattern and the at least one protocol anomaly must occur in the packet flow for the compound attack definition to determine that the packet flow constitutes the network attack;

configure a forwarding plane of a network device to apply the compound attack definition to a packet flow of a computer network to determine whether the packet flow constitutes the network attack in that the packet flow includes both of the at least one pattern and the at least one protocol anomaly in the order specified by the compound attack definition; and selectively discard with the forwarding plane the packet flow based on the determination of whether the packet flow constitutes the network attack.

26. A method comprising:

storing, within a network device, a compound attack definition for detecting a network attack identified by ordered occurrences in a packet flow of both at least one pattern and at least one protocol anomaly, wherein the at least one pattern identifies a binary pattern associated with a network attack that is different from the at least one protocol anomaly, and wherein the compound attack definition specifies all of: (i) the at least one pattern of the network attack, (ii) the at least one protocol anomaly of the network attack and (iii) an order in which the at least one pattern and the at least one protocol anomaly occur within the packet flow of the computer network to identify the network attack, applying, with the network device, the compound attack definition to a placket flow of a computer network by:
(i) processing the packet flow with protocol-specific decoders to identify application-layer elements; and
(ii) analyzing the application-layer elements to determine whether the packet flow constitutes the network attack in that (i) the at least one pattern is present within the application-layer elements, (ii) the at least one protocol anomaly is detected within relationships between the application-layer elements, and (iii) the pattern and protocol anomaly occur within the packet flow in accordance with the order specified by the compound attack definition; and selectively discarding the packet flow based on the determination of whether the packet flow constitutes the network attack.

27. The method of claim 1, wherein presenting a user interface to define a compound attack definition comprises presenting a user interface having a single screen that includes the first input, the second input and the third input to define the compound attack definition for detecting the network attack identified by the ordered occurrences in the packet flow of both the at least one pattern and the at least one protocol anomaly for the communication protocol.

28. A method comprising:

presenting, with a network device, a user interface to define a compound attack definition for detecting a network attack identified by ordered occurrences in a packet flow of both at least one pattern and at least one protocol anomaly, wherein the at least one pattern identifies a binary pattern associated with a network attack that is different from the at least one protocol anomaly, and wherein the user interface includes a first input to select the at least one pattern, a second input to select the at least one protocol anomaly, and a third input that specifies an order in which the at least one pattern and the at least one protocol anomaly must occur in the packet flow for the compound attack definition to determine that the packet flow constitutes the network attack and wherein the order specified by the compound attack definition includes specifying that the at least one pattern occurs before the at least one protocol anomaly in the packet flow;

receiving, with the network device, input data selecting the at least one protocol anomaly, the at least one pattern and the order via the respective first, second and third inputs of the user interface to define the compound attack definition for detecting the network attack;

with the network device, applying, in accordance with the order specified by the compound attack definition, the at least one pattern to the packet flow to detect the pattern within the packet flow; and only after detecting the pattern in the packet flow, applying, with the network device, the at least one protocol anomaly to the packet flow in accordance with the order specified by the compound attack definition to determine whether the packet flow constitutes the network attack; and selectively discarding, with the network device, the packet flow based on the determination of whether the packet flow constitutes the network attack.

29. A method of claim 28, wherein the method further comprises:

presenting the user interface to define a different compound attack definition for detecting a different network attack identified by ordered occurrences in a packet flow of both at least one pattern and at least one protocol anomaly, wherein the user interface includes the first input to select the at least one pattern, a second input to select the at least one protocol anomaly, and the third input that specifies an order in which the at least one pattern and the at least one protocol anomaly must occur in the packet flow for the different compound attack definition to determine that the packet flow constitutes the different network attack, and wherein the order specified by the compound attack definition includes specifying that the at least one pattern occurs after the at least one protocol anomaly in the packet flow;

applying, in accordance with the order specified by the different compound attack definition, the at least one protocol anomaly to the packet flow to detect the protocol anomaly within the packet flow; and only after detecting the protocol anomaly in the packet flow, applying the at least one pattern to the packet flow in accordance with the order specified by the different compound attack definition to determine whether the packet flow constitutes the different network attack.

* * * * *